July 5, 1927.

W. S. ADAMS 1,635,021

BRAKE

Filed July 3, 1925

Inventor.—
Walter S. Adams,
by his Attorneys,—
Howson & Howson.

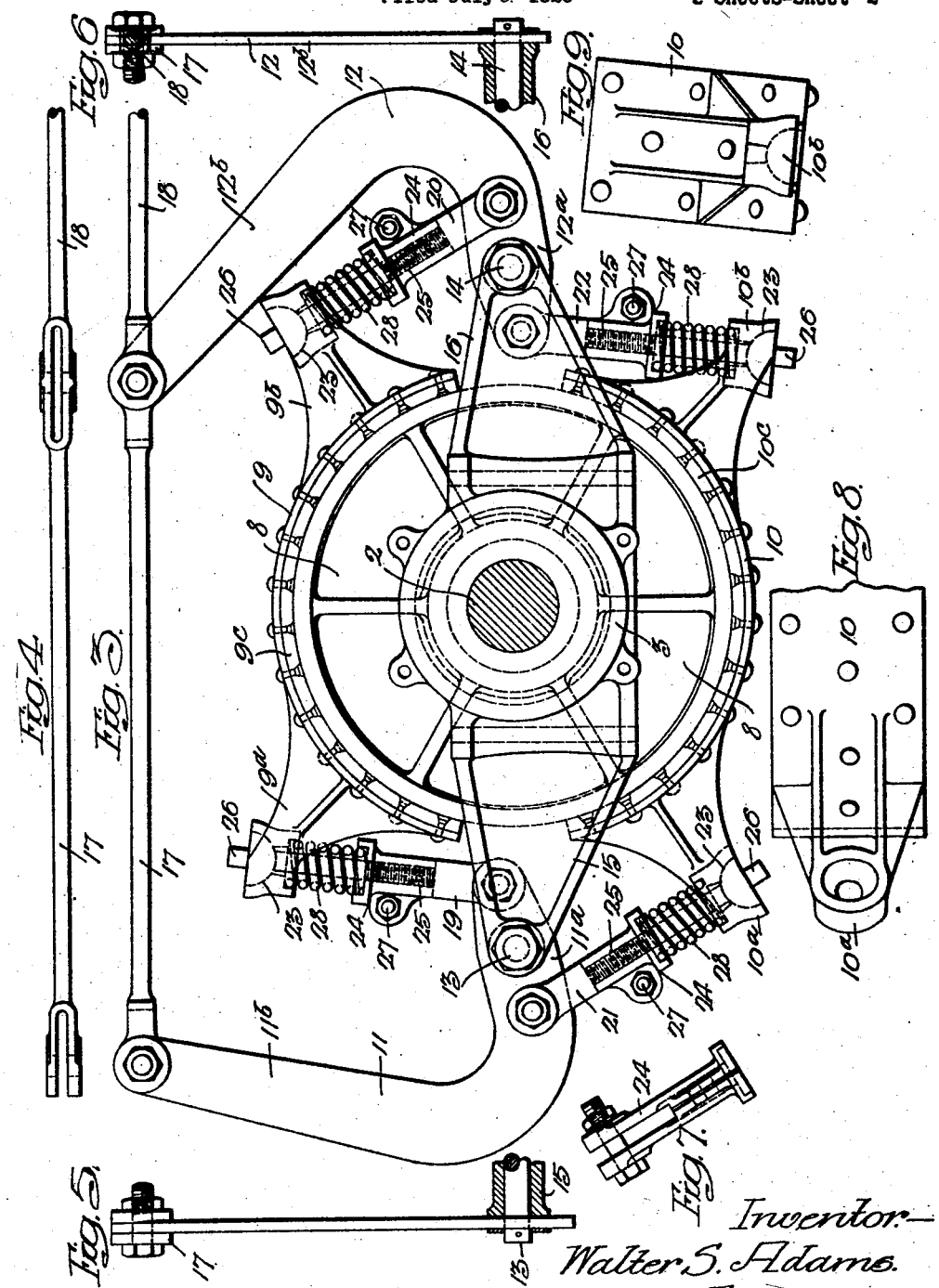

Patented July 5, 1927.

1,635,021

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BRAKE.

Application filed July 3, 1925. Serial No. 41,288.

This invention relates to a brake mechanism which is particularly applicable to the trucks of railway cars, but it will be understood that the invention is not necessarily so limited. In accordance with the invention two separate brake shoes are provided for co-operating with the brake drum and the principal object of the invention is to provide a simple and effective mechanism for applying pressure to both ends of both brake shoes so as to secure the maximum braking action. Further objects of the invention will be apparent from the following specification and claims.

In the accompanying drawings I have shown the embodiment of the invention which I now deem preferable but it will be understood that the drawings are for illustrative purposes only and that various changes and substitutions may be made within the scope of the claims without departing from the spirit of the invention.

Of the drawings:

Fig. 3 is an enlarged view of the brake mechanism, this view being partly in section along the line 3—3 of Fig. 1.

Figs. 4 to 9 show details of the mechanism as illustrated in Fig. 3.

Figure 1:
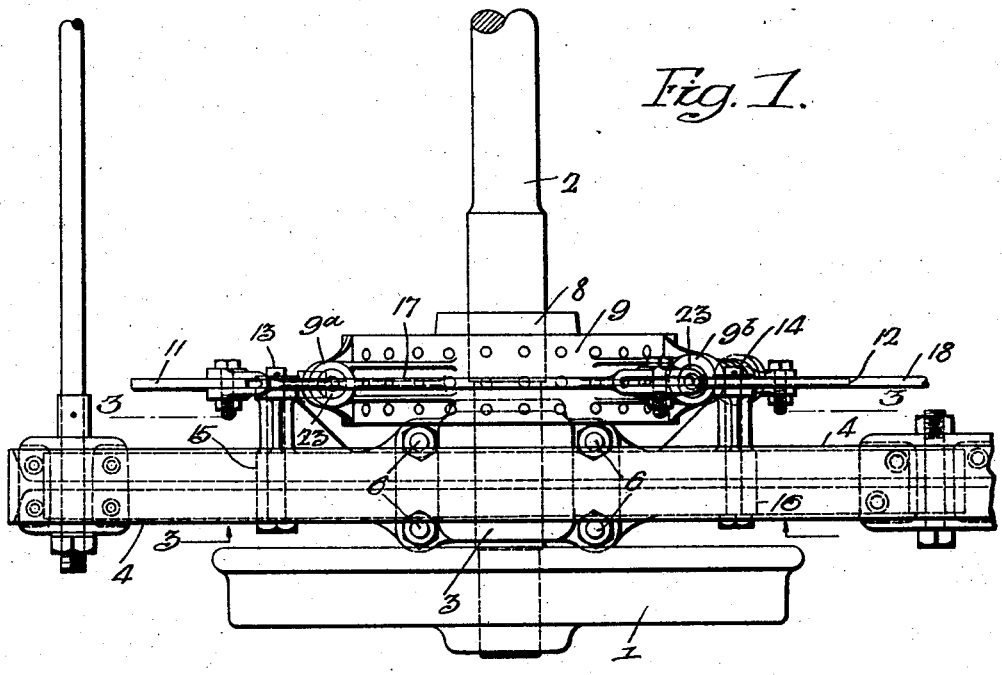
Fig. 1 is a plan view of a portion of a railway truck having a brake mechanism embodying the invention.
Figure 2:
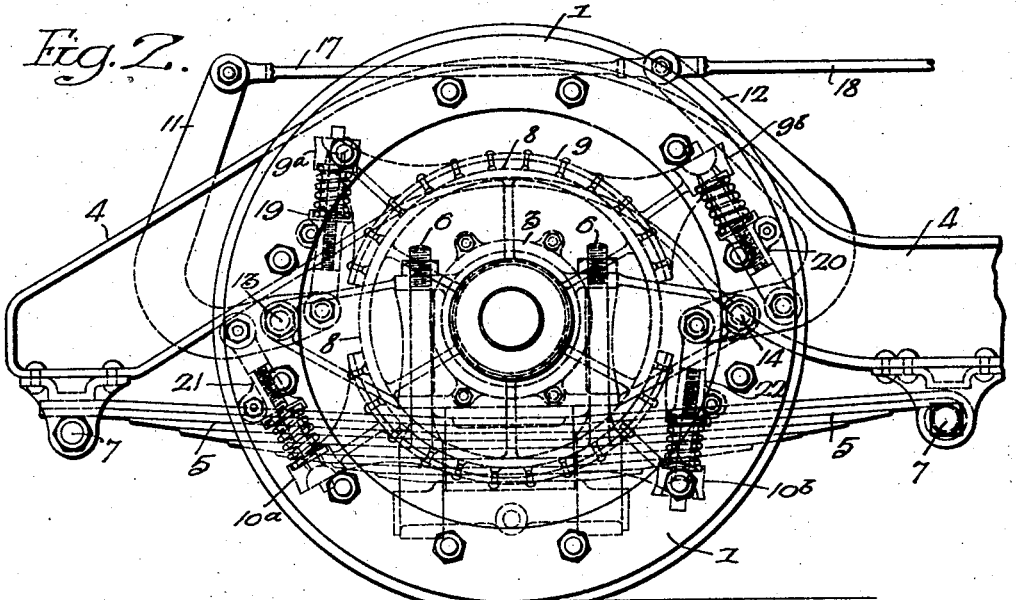
Fig. 2 is a side view of that part of the truck shown in Fig. 1.

Referring to the drawings, 1 represents one of the truck wheels and 2 the axle to which the wheel is secured. The axle 2 is provided with a bearing box 3. The frame of the truck is represented at 4 and this frame is supported on the bearing box 3. There are several well known types of construction for supporting the frame on the box, and for purposes of illustration I have shown a semi-elliptic spring 5 which is secured to the bearing box 3 by means of bolts 6, 6 and which is connected with the frame by means of shackle pins at 7, 7. It will be observed that the spring 5 not only serves to transmit the weight of the frame to the bearing box but also serves to prevent the bearing box from rotating.

Secured to the axle 2, preferably near the frame 4, is a brake drum 8 and two brake shoes 9 and 10 are provided for co-operative engagement with the drum. The shoes are preferably somewhat flexible at their central portions and are provided at or near their ends with brackets $9^a$ and $9^b$, and $10^a$ and $10^b$. Renewable linings $9^c$ and $10^c$ are provided.

For supporting and controlling the brake shoes there are provided two operating levers 11 and 12 which are mounted for movement about oppositely disposed fixed pivots 13 and 14. The two pivots 13 and 14 are preferably located midway between the two brake shoes and are preferably at the same level as the axis of the axle 2, the shoes 9 and 10 being respectively above and below the axle. The two pivots 13 and 14 may be mounted in different ways but I prefer and have shown these pivots as carried by arms 15 and 16 projecting horizontally from the bearing box 3 and preferably formed integrally therewith.

The two levers 11 and 12 comprise portions $11^a$ and $12^a$ which are directly supported on the respective pivots 13 and 14 and also comprise upward extending portions $11^b$ and $12^b$ which are at angles to the first said portions $11^a$ and $12^a$. The two portions $11^a$ and $12^a$ are parallel and approximately horizontal although they may be slightly inclined as shown. The two portions $11^b$ and $12^b$ are connected together by means of a link 17. Provision is made for operating the two levers in unison, this means being shown as a link 18 connected with or forming a part of the link 17.

For controlling the engagement between the respective shoes 9 and 10 and the drum 8, I provide two pairs of links 19 and 20 and 21 and 22. The two links 19 and 20 are connected with the respective lever portions $11^a$ and $12^a$ at one side, in this case the right side, of the respective pivots 13 and 14. The other ends of these links are connected with the aforesaid brackets $9^a$ and $9^b$ projecting from the brake shoe 9. Similarly the links 21 and 22 are pivotally connected with the portions $11^a$ and $12^a$ of the levers at the other side, in this case the left side, of the respective pivot pins 13 and 14. The other ends of the links are pivotally connected with the aforesaid brackets $10^a$ and $10^b$ projecting from the brake shoe 10.

The links 19, 20, 21 and 22 are similar in construction and mounting and a detailed description of one of them will suffice for all. Each of the links has at its outer end a ball and socket connection with the corresponding brake shoe bracket. This enables the brake shoe to accommodate itself to any equalities in the mechanism or in the brake shoe lining. Each of the brake shoe brackets is provided with a hemispherical socket in which is seated a ball element 23 secured to or forming a part of the link. Each link is preferably adjustable in length and as illustrated there are two separate parts 24 and 25 threaded together. The female part 24 is made in the form of a fork which straddles the corresponding operating lever. Provision is made for turning the male member 25 which carries the ball element 23, and as shown the end thereof is made square at 26. The adjustment in length is secured by turning the male member 25 and in order to lock the two parts after adjustment the member 24 is split adjacent the threads and a bolt 27 extends transversely through two ears projecting from the two split portions. By drawing these ears together the bolt 27 serves to clamp the member 25 and thus prevent any rotation thereof.

In order to hold the ball element 23 in engagement with the socket, I provide a coil spring 28 which extends between the member 24 and the corresponding brake shoe bracket. As shown the spring 28 is seated in annular recesses formed respectively in the member 24 and in the corresponding brake shoe bracket.

It is believed that the operation of the brake mechanism will be apparent from the foregoing description. Movement of the link 18 toward the right as shown in Fig. 3 will turn the levers 11 and 12 in the clockwise direction. This movement of the levers will draw the links 19 and 20 downward and the links 21 and 22 upward thus forcing the shoes 9 and 10 against the brake drum. Inasmuch as pressure is applied to the shoes near the ends and inasmuch as the shoes are slightly flexible at their central portions, the pressure causes them to wrap around the drum and to effectively engage it throughout their entire lengths. Movement of the link 18 toward the left will reverse the action which has been described and will release the brake shoes.

It will be clear that the two brake shoes may be caused to exert equal pressure by properly adjusting the links of the respective links 19 and 20 or 21 and 22. The links may also be adjusted in length to compensate for the wear of the brake linings.

What I claim is:

1. The combination in a brake mechanism of a rotatable brake drum, two operating levers respectively mounted for movement about two fixed axes at opposite sides of the axis of the drum, means for moving the two levers in unison, two brake shoes adapted to engage the drum at opposite sides thereof and midway between the two pivotal axes, a pair of links having ball-and-socket connections with the respective ends of one shoe and also having pivotal connections with the respective operating levers at the same sides of the pivotal axes thereof, and a second pair of links having ball-and-socket connections with the respective ends of the other shoe and also having pivotal connections and the respective operating levers at the same sides of the pivotal axes thereof and opposite to the points of connection of the first said links, each of the said links comprising male and female members threaded together with a ball element formed on the male member and with the said male member provided with a projection beyond the ball element whereby the said member may be turned.

2. The combination in a brake mechanism of a rotatable brake drum, two operating levers respectively mounted for movement about two fixed axes at opposite sides of the axis of the drum, means for moving the two levers in unison, two brake shoes adapted to engage the drum at opposite sides thereof and midway between the two pivotal axes, a pair of links having ball-and-socket connections with the respective ends of one shoe and also having pivotal connections with the respective operating levers at the same sides of the pivotal axes thereof, a second pair of links having ball-and-socket connections with the respective ends of the other shoe and also having pivotal connections with the respective operating levers at the same sides of the pivotal axes thereof and opposite to the points of connection of the first said links, each of the said links comprising male and female members threaded together with a ball element formed on the male member, and springs interposed between the female members of the respective links and the ends of the corresponding brake shoes for holding the ball-and-socket connections in engagement.

WALTER S. ADAMS.